March 31, 1970     T. F. BEDNAR ET AL     3,504,376

AUTOMATED CHEMICAL ANALYZER

Filed Dec. 15, 1966     5 Sheets-Sheet 1

INVENTORS
THOMAS BEDNAR
GEORGE C. REID
ARTHUR T. YAHIRO

BY Ronald Zibelli

ATTORNEY

March 31, 1970 T. F. BEDNAR ET AL 3,504,376
AUTOMATED CHEMICAL ANALYZER
Filed Dec. 15, 1966 5 Sheets-Sheet 2

INVENTORS
THOMAS BEDNAR
GEORGE C. REID
BY ARTHUR T. YAHIRO

Ronald Zibelli
ATTORNEY

INVENTORS
THOMAS BEDNAR
GEORGE C. REID
ARTHUR T. YAHIRO
BY
Ronald Zibelli
ATTORNEY March 31, 1970  T. F. BEDNAR ET AL  3,504,376
AUTOMATED CHEMICAL ANALYZER
Filed Dec. 15, 1966  5 Sheets-Sheet 4

INVENTORS
THOMAS BEDNAR
GEORGE C. REID
ARTHUR T. YAHIRO
BY Ronald Zibelli
ATTORNEY INVENTORS
THOMAS BEDNAR
GEORGE C. REID
ARTHUR T. YAHIRO
BY
Ronald Zibelli
ATTORNEY United States Patent Office 3,504,376
Patented Mar. 31, 1970

3,504,376
AUTOMATED CHEMICAL ANALYZER
Thomas F. Bednar, La Canada, George C. Reid, Glendora, and Arthur T. Yahiro, West Covina, Calif., assignors to Xerox Corporation, Rochester, N.Y., a corporation of New York
Filed Dec. 15, 1966, Ser. No. 602,025
Int. Cl. G01n *33/16, 21/00*
U.S. Cl. 23—230                                      141 Claims

ABSTRACT OF THE DISCLOSURE

An automated chemical analyzer and method of use having disposable testing containers of specific design passed therethrough. Sufficient reagents to conduct a single test are stored within the disposable testing container and are dispensed from their storage chambers to a reaction compartment as needed during the course of the analytical procedure. In a preferred embodiment, at least a portion of the reaction compartment is optically transparent so the reaction compartment can be utilized as a cuvette for optical analysis. A particularly useful disposable testing container has a plurality of reaction compartments, and associated reagent storage chambers, so that a comparison analysis can be conducted concomitantly with the primary test.

---

This invention relates to automatic chemical analysis and, more particularly, the invention relates to the automatic chemical analysis of body fluids, such as blood, urine, etc.

In the past, many routine, manual laboratory procedures have been conducted upon body fluids as an aid to the physician in determining, diagnosing, or preventing the various ailments which afflict mankind. As the science of medicine progresses and becomes more sophisticated in its analysis, new laboratory procedures and techniques are developed which analyze such fluids in search for a hidden clue which will establish or negate the existence of a particular affliction.

At the same time that medical science is developing new tests to aid in pinpointing particular afflictions, the population of the United States, and of the world, is expanding at an enormous rate. New phrases, such as "the population explosion," have been coined to express this physical phenomenon which is presently occurring and will continue to occur throughout the existence of mankind. Thus, with more tests being conducted per person and more people coming in need of such tests with each passing day, it becomes evident that more people must be trained and/or new devices must be developed to meet this onrushing demand.

This problem has plagued mankind for many years and it is equally evident that the solution of training more qualified people to conduct this ever increasing amount of clinical analysis has not been equal to the task. Most clinical departments are headed by a resident pathologist or a licensed medical technologist who supervises a trained staff of laboratory technicians. As the majority of laboratory technicians are young, unmarried girls the turn-over rate is unusually high because of ensuing marriages which require the wife to devote her time to the needs of her family. The resulting manpower shortage places a limit both upon the quantity of clinical tests which can be conducted as well as the quality for, when one is burdened with an ever increasing amount of work which must be completed within a unit period of time, human errors are bound to become more prevalent.

To fulfill this ever increasing demand which is not being adequately met by our expanding technical labor supply, new devices have been developed to assist the laboratory technician in conducting a greater number of tests per unit time. Many of these devices took the approach of merely mechanizing, or automating, the purely manual operations of the ordinary clinical chemist or analyst. Exemplary devices of this type are shown by Hewson U.S. No. 2,560,107; De Seguin Des Hons U.S. No. 3,143,393; Baruch in U.S. Nos. 3,193,358 and 3,193,359; and Natelson U.S. No. 3,219,416. This approach results in a device having test tubes, funnels, reagent containers, pumps and other associated means for bringing a particular sample and the necessary reagents together to perform a desired analysis. Though the devices unquestionably perform more analyses per unit time the devices, as a whole, are subject to other objections which are similar to those stressed when a technician manually performs the analytical procedures. That is, the repetitious use of the same laboratory equipment for a plurality of distinct analyses poses the problem of contamination. To overcome this detrimental aspect a significant portion of the operating time of the devices must be allocated to the repetitious cleaning of the equipment to provide a clean environment for subsequent tests. As a result, the efficiency in terms of the number of tests which can be conducted per unit time is drastically diminished.

An additional detrimental feature of such devices, as well as other prior art devices, is the fact that they are initially programmed to perform a plurality of tests of a single type. That is, a plurality of samples are taken and a single test, for example, blood sugar, is run on each sample,. The device must be reprogrammed to provide for additional tests on the remaining portions of the samples. In many instances, the devices cannot be so reprogrammed or to do so requires substantial modification or repositioning of the component parts by the operator. These modifications reduce the flexibility of the device and further diminish the improvement which can be obtained in performing purely manual procedures through mechanical means.

A recent automatic apparatus which has achieved some measure of success is the "Auto-analyzer" produced by the Technicon Instruments Corporation of Chauncey, New York. This apparatus is disclosed in the patents to Skeggs U.S. Nos. 2,797,149 and 2,879,141, as well as numerous other United States patents assigned to the Technicon Instruments Corporation. As disclosed in the aforementioned patents, a fluid sample to be analyzed is passed through tubular passages and a proportioning pump comprising a plurality of resilient flexible tubes, a platen, and a plurality of pressure rollers. The sample to be analyzed with one or more processing fluids is passed through one side of a dialyzer while one or more secondary processing fluids are passed through the other side of the dialyzer thereby resulting in the separation from the sample of various constituents which pass through the dialyzer to the secondary processing fluids. Air is introduced into both flow streams before they reach the dialyzer to break up each stream into a plurality of liquid segments separated by air segments or bubbles. The air segments are stated to have the dual purpose of separating the sample fro meach other as well as providing a cleansing action between successive samples in order to prevent cross-contamination. The diffusate passing from the dialyzer is subjected to treatment to induce color change in the liquid segments thereof indicative of the concentration of the constituent for which the sample is being analyzed. Normally, the air or other inert fluid which has been introduced into the fluid streams to segment the fluid material is then withdrawn from the stream at a point before colorimetric examination leaving a continuous liquid stream for final examination.

Finally, the treated diffusate is directed to a flow cell of a colorimeter in which it is subjected to colorimetric examination to provide a quantitative measurement of the constituent being analyzed.

Present commercial forms of the "Auto-analyzer" comprise a plural-channel apparatus which simultaneously performs a plurality of different tests on a single test sample. Though there are approximately twenty different tests which can be conducted with the apparatus, it is not possible to program the analyzer to perform any number of tests less than the number of channels. Thus, when a physician requires only one or two tests to be conducted upon a particular sample, the unit cost per test is increased because the apparatus is non-selective and must do a profile analysis. Additionally, since a plurality of different samples having different concentrations of the constituent for which the sample is being analyzed are being passed through the flexible tubular passages, the flow cuvette, the dialyzer, etc., there is a problem of sample carryover or contamination which can have a significant effect on the reliability of the analytical data. To reduce contamination, cleansing fluids are generally provided in an attempt to assure a contamination free environment. This further encumbers an already complicated apparatus.

In operation, the proportioning pump passes the various fluids through a maze of flexible tubes. The repetitious flexing and continuous working of the tubes causes them to wear out very readily with the result that minute cracks can be found throughout. This results in areas which are more easily wetted by sample material passing therethrough thus adding to the contamination factor of the overall apparatus, as well as increasing the operational expense occasioned by the necessity of replacing worn tubing. Preceding each period of operation there is a required lengthy warmup period. Additionally, a calibration curve must be obtained each time the machine is started up to assist in compensating for various deviations which may occur during non-operating periods and, for proper analysis, a second calibration curve must be obtained at the end of each run to pinpoint deviations which occur during operation. Finally, the preliminary analytical data obtained through use of this apparatus with respect to each particular sample must be correlated with the aforementioned calibration curves to provide the final analytical data in a form considered reliable by the physician. Such factors limit the total effect such an apparatus can have on clinical analysis as significant amounts of time must be spent by the technician in calibrating the apparatus and subsequently placing the analytical data so obtained in a reliable form.

It is therefore an object of the present invention to provide an automated analytical apparatus and system which is not subject to the aforementioned deficiencies.

It is an object of the present invention to provide an apparatus and system for the automatic chemical analysis of fluid materials and, in particular, body fluids such as blood and urine.

It is a still further object of the present invention to provide an apparatus and system for the automatic analysis of body fluids wherein a disposable reaction container is utilized.

A still further object of the present invention is to provide an automatic analyzer for testing body fluids which utilizes a disposable chemical testing package having at least one and, preferably, all the necessary reagents stored therein.

A still further object of the present invention is to provide an automatic chemical analyzer system which is capable of simultaneously performing a plurality of different tests on a plurality of different samples.

A still further object of the present invention is to provide a disposable reaction container having a plurality of chambers for the storage of prepackaged reagents and at least one optically transparent compartment which functions as a cuvette for optical analysis.

The above and still further objects, features and advantages of the present invention will become apparent upon consideration of the following detailed disclosure of specific exemplary embodiments of the present invention.

The above and still further objects of the present invention are achieved by providing an automated chemical analytical system including a plurality of different disposable reaction containers, each different reaction container representing one prepackaged chemical testing unit, a magazine for the storage of said plurality of different reaction containers, the magazine being partitioned into a plurality of storage compartments with each of the different reaction containers being stored in a separate compartment with only like prepackaged reagent-storing containers, a station for the addition of sample to said reaction containers, said sample addition station including means to dilute a particular sample to the appropriate concentration, at least one reagent addition station, a mixing and incubation station wherein the reaction mixture is maintained in the disposable container for a period of time sufficient to culminate the chemical reaction, a detection station wherein the analytical data is obtained by monitoring one or more of the physical properties of the reaction mixture, a disposal station wherein the disposable reaction container is eliminated from the system, and means to transport said disposable reaction container from its storage area in said magazine through the system to said disposal station. The aforementioned disposable container has at least one lower compartment for the admixing and reaction of reagents and sample, and an upper section having a plurality of reagent storage chambers in communication with each reaction compartment. At least one wall or end portion of the reaction compartment may be optically transparent so that upon completion of the desired chemical reaction the compartment can be utilized as a cuvette for optical analysis.

The automated analytical system briefly described above, and which will be described in greater detail hereinafter, has many features which clearly show the significant advance the present invention represents over the prior art. Initially, by prepackaging the reagents in a disposable container the system is given utmost flexibility without sacrificing any speed which would normally be desired in an automated system. Flexibility is achieved by providing a plurality of different disposable containers within the system, each container representing a prepackaged chemical testing unit which can be selected at random and passed through the system according to a previously programmed procedure. That is, it is possible to select any number of different tests and run them simultaneously upon a plurality of different samples. Increased speed is achieved because the system is designed to perform many operations on different samples simultaneously. It need not be reprogrammed, portions of the machine need not be repositioned, incubation conditions need not be modified, reagent storage vessels need not be filled or replaced and there need not be a lengthy warm-up period prior to operation of the system. Since the reagents are stored within the disposable container, it is not necessary to provide complicated apparatus for the transportation of the reagents from their storage compartments to the reaction site. Once the reaction is complete and the disposable container has been passed through the optical read-out station, the unit passes from the system thus relieving technicians of the necessity of cleaning and/or repairing used equipment for subsequent testing. With these features in mind, it is believed that the significant improvement this invention represents over the prior art should be apparent.

The nature of the invention will be more easily understood when it is considered in conjunction with the accompanying drawings wherein.

Figure 1:
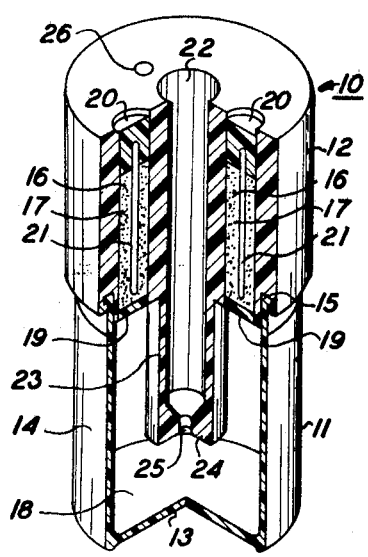
FIGURE 1 is an enlarged sectional perspectve view of an exemplary disposable container of the present invention.
Figure 2:
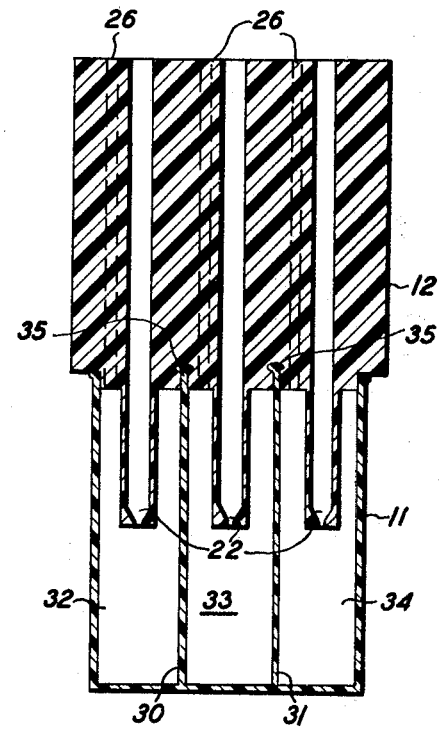
FIGURE 2 is an enlarged sectional view of another exemplary disposable container of the present invention.

Referring to FIGURE 1, there is seen a container 10 having a lower section 11 and an upper storage section 12. Section 11 has an end portion 13 and side wall 14, the upper end of side wall 14 terminating in a flange 15 provided for the fixed engagement of section 11 with storage section 12. One or more chambers 16 are provided in section 12 for the storage of appropriate reagents 17. Chambers 16 are in communication with reaction compartment 18. Plugs 19 in slidable engagement with the walls of chambers 16 are provided to prevent the premature spilling of contents 17 into the reaction compartment. Additional plugs 20 are provided at the upper end of chambers 16 in a similar manner to prevent the loss of the reagent material from the disposable container. Rods 21 connecting each set of plugs in a particular chamber are provided to assist in forcing plugs 19 out of chambers 16. The application of a pushing force upon plugs 20 will be transmitted through rods 21 to plugs 19 thereby forcing the latter plugs and the contents of chambers 16 into reaction compartment 18. A channel 22 passing through storage section 12 and extending into compartment 18 is provided for the addition of sample; distilled water; and reagents which were not stored, for one reason or another, in the storage chambers. In the preferred embodiment, it is contemplated that all the necessary reagents will be stored in chambers 16. Side wall 23 of channel 22 extends into compartment 18 and terminates in flange 24 defining aperture 25. It is through channel 22 and aperture 25 that the additional materials are added to compartment 18. Channel 26 extends through section 12 into communication with compartment 18 to permit venting of gases trapped in the compartment during sample and reagent addition. The vent channel can be parallel to the main channel 22 (as shown in FIGURE 2), or it can have a short horizontal or slanted leg connecting two vertical legs thus defining a trap in the venting passage which will aid in preventing the premature spilling of the contents of compartment 18. As shown, the entire unit comprises cylindrical shaped elements offering little or no resistance, corners, etc., which would hinder the movement of such containers. However, there are flanges, etc., which can be grasped by transportation means to move the disposable container through the automatic analyzer system from its storage magazine to the disposal station. It should be understood, however, that any desired shape of either the container or its component parts may be chosen and that the cylindrical form has been herein described only because of its aforementioned advantage.

In operation, container 10 is taken from a supply magazine and passed to a sample addition station where the proper amount of sample diluted with distilled water is aliquoted into compartment 18 through channel 22 and aperture 25. The sample-containing container is then passed to a reagent addition station where the application of a pushing force on plugs 20 forces plugs 19 and reagents 17 out of chambers 16. Preferably, plugs 19 are made of a material which will either float on the surface of the liquid in compartment 18 or sink to the bottom thereof. This is desirable so that they will not interfere with any subsequent optical analysis (i.e., they will not be in the optical path). Container 10 is passed to a mixing station where it is maintained for a time sufficient to ensure the dissolution of all solid materials in the liquid contained in compartment 18. The container next passes to an incubation station where appropriate reaction conditions are imposed upon the materials within the container for a time sufficient to complete the desired reaction which is then measured at a detection station. It is not necessary that the mixing and incubation stations be separate and distinct as it is feasible to have one station where both results can be achieved. At the detection station, for example, a cylindrical light source probe can be passed down through channel 22 until it rests upon flange 24. Flange 24, a constant fixed distance from end wall 13, acts to define a fixed optical path through the reaction mixture. By carefully controlling the manufacture of disposable containers 10, the optical path is a constant for each and every analysis. Appropriate detection means, such as a photo-multiplier tube, placed below optically transparent end portion 13 of compartment 18 operates in combination with the light source to yield the desired test data. Alternatively, light can be passed through the optically transparent side wall 14 of the container to similar detection means. Additional means are associated with container 10 to identify the particular sample as to its source and as to the particular test being run thereon. For example, the container can have magnetic coding placed on the side thereof or a data punch tape attached thereto. The associated mechanisms for placement and read-out of such data are well known in the art. Means are also provided to correlate such information to establish an appropriate record for subsequent reference. The container finally passes to a disposal station where it is withdrawn from the system.

Figure 3:
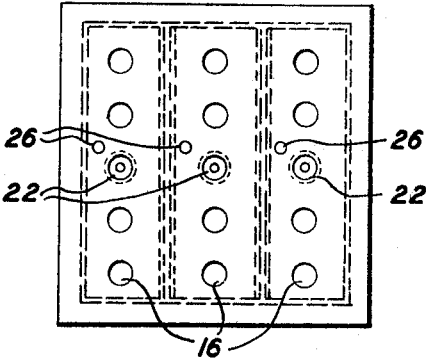
FIGURE 3 is a top view of the disposable container of FIGURE 2.

An alternate embodiment of the present invention is shown in FIGURES 2 and 3 wherein lower section 11 is partitioned by interior walls 30 and 31 into three distinct compartments 32, 33, and 34. Walls 30 and 31 formed as an integral part of lower section 11 terminate in lips 35 which are held snugly in grooves provided in upper section 12 thereby creating the three separate and non-communicating compartments. In compartment 32 there is a reference material, normally diluted reagent. Chamber 33 has provided therein a solution of the material being tested in the absence of reagents. In certain instances, one or more reagents can be added to this latter solution, provided the reagents do not carry the reaction to completion or do not adversely affect, in any other way, the optical analysis. Through use of these two solutions measurements are made which cancel the error due to variations in the reagent or sample material. Into chamber 34 there is introduced the sample material to be tested along with the appropriate diluents and one or more reagents. As in FIGURE 1, channel 22, reagent-storage chamber 16, and venting channel 26 are provided in upper section 12 for introducing sample and stored reagents into each chamber 32, 33, and 34, and for venting gases which would otherwise be trapped in the respective chambers.

In operation, the container of FIGURES 2 and 3 follows the same path as the container of FIGURE 1. At the detection station, however, light beams are passed through each chamber to obtain the desired analytical data. Light sources can be passed down into channels 22 in communication with each of the respective chambers as in FIGURE 1. Once again, there will be a fixed optical path leading to a detection unit, such as a photomultiplier tube. Alternately, the beam of light can be passed through the side walls of each chamber. To eliminate adverse effects from light scattering, walls 30 and 31 can either be made of an opaque material or can be coated with an opaque material to prevent the passage of light therethrough.

To calibrate the detection mechanism, "standard" samples containing known amounts of the constituents under analysis are passed through the detection station. The detection mechanism will analyze each standard and then adjust itself for deviations from the known value. Alternatively, a standard solution can be used in place of the diluted reagent in the disposable container. This standard solution can be injected into the disposable container at any point in the system prior to optical analysis and will obviate the need for passing distinct standards through the system. Once again, the detection mechanism will analyze each standard and adjust for deviations from the known value. Use of this disposable container in combination with a continuous self-calibrating optical read-out station will yield analytical data of exceptional reliability.

Figure 4:
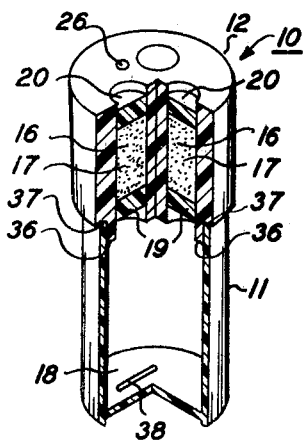
FIGURE 4 is an enlarged sectional perspective view of still a further exemplary embodiment of the present invention.

Referring to FIGURE 4, there is seen a disposable container wherein either the vent channel or one of the reagent storage chambers is utilized as the sample addition channel. Specifically, container 10 has a lower section 11 which, in this instance, is the same as the lower section in FIGURE 1 and an upper section 12. One or more chambers 16 in communication with reaction compartment 18 are provided in section 12 for the storage of appropriate reagents 17. Any gases which might be trapped in the reaction compartment during sample and/or reagent addition are vented through channel 26. Plugs 19 and 20 at each end of chambers 16 prevent the premature spilling of reagents 17 into the reaction compartment or out of the container, respectively. It should be noted that in this embodiment no rods are provided to connect the plugs at the opposite end of each chamber for it has been found that by selecting a proper length to diameter ratio it is possible to push plugs 20 the entire length of the chamber with relative ease. By selecting the proper ratio, the plug can be moved the entire distance without jamming or "freezing" so that all the contents of the chamber can be emptied into the reaction compartment to produce the desired reagent mixture.

The disposable container of FIGURE 4 differs additionally from the container of FIGURE 1 in that upper section 12 has a lower extension 36 of an outside diameter equal to the inside diameter of the lower section; accordingly, this results in a very snug, slidable engagement of the upper section and the reaction compartment. Upper section 12 has an end wall 37 which limits the downward movement of section 12 into lower section 11. In the bottom of the container there is a magnetic stirring bar 38, for example a small cylindrical section of stainless steel wire. Should the magnetic material have a deleterious effect on the assay, then the stirring bar is entirely covered with a material which will not interfere with the analytical procedure, such as glass or plastic. With the reaction mixture in the lower compartment, the disposable container is moved to a mixing station where an external rotating magnetic field is applied, such as by a rotating magnetic bar. The rotation of the magnetic bar within the disposable container creates a vortex with the liquid material in the reaction compartment being substantially higher along the outside wall of the chamber than it is in the center. By regulating the rotational speed of the magnetic stirring bar it is possible to thoroughly mix all the reagents with the sample as well as to clean the walls of the reaction compartment and the lower extension of the upper section of the undissolved reagents. This ensures that all reagents are present in the reaction mixture in the proper amounts.

Figure 6:
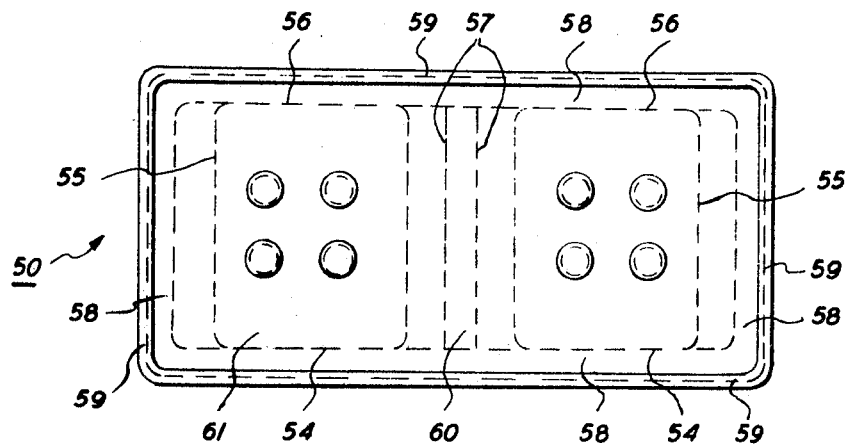
FIGURE 6 is a top view of the exemplary container of FIGURE 5.
Figure 5:
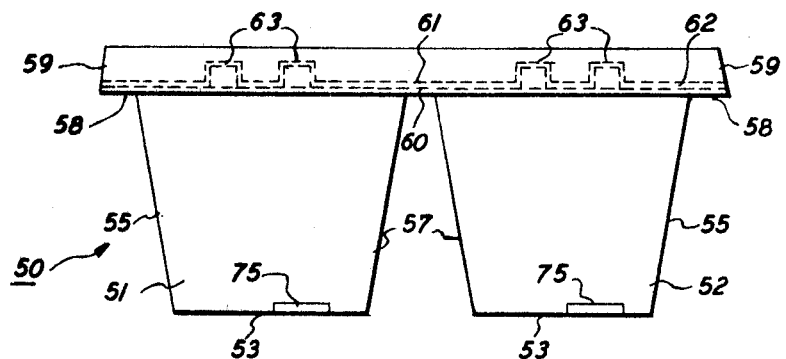
FIGURE 5 is an enlarged side view of still a further exemplary embodiment of the present invention.

Referring to FIGURES 5 and 6 there is seen a disposable container 50 having two separate lower compartments 51 and 52. Each lower compartment has a bottom wall 53, exterior side walls 54, 55, 56 and interior walls 57. As shown, walls 54 and 56 are vertically disposed while walls 55 and 57 diverge outwardly from end wall 53 toward the top of each respectvie compartment. Bottom walls 53 are in a shape of a rectangle with slightly rounded edges and corners (though the shape is not in any way critical). Since the walls 55 and 57 diverge slightly from end wall 53 toward the upper part of the compartments, the opening at the top of the compartment also defines a rectangle having the same width as the rectangle formed by bottom wall 53 but with a sligtly longer length. The shape of the opening is not critical as long as it will not interfere with the introduction of sample and reagents into the lower compartment. The sloping walls 55 and 57 channel all materials downward toward the bottom of the unit. It is equally true that side walls 54 and 56 can be slanted inwardly from the opening down toward bottom walls 53 and thus aid in channelling material to the bottom of the compartment, however, it is preferred that they remain parallel for optical reasons. The wall portions of compartments 51 and 52 terminate in a horizontal flange 58 which encircles the outer perimeter of the two compartments and holds them together as a distinct unit. Flange 58 terminates in an upwardly extending lip 59 which is folded inwardly to hold reagent storage section 61 in place on top of horizontal flange 58. Interior walls 57 extend slightly above the plane of horizontal flange 58 and are connected to each other at a point 60 thus defining a distinct barrier between compartments 51 and 52.

Resting on flange 58 and barrier 60 is reagent storage section 61. Section 61 comprises an upper layer 62 defining a plurality of reagent storage chambers 63 in the form of "top-hats." On the underneath or open portion of layer 62 is a thin weak restraining layer (not shown) for holding the reagents in the respective chambers. Application of force on the top of the chambers will cause the shearing of restraining layer at a point immediately below the "top-hat" resulting in the inversion of "top-hat" 63. Reagent or other material stored therein will be emptied into the lower compartment. In each of the bottom compartments there is a magnetic stirring bar 75 substantially encased in a material which is non-deleterious to the analysis.

The disposable container of FIGURES 5 and 6 is used in conjunction with a double-beam detection mechanism. In one compartment there is provided a solution of the material being tested with all the reagents which will bring the reaction mixture to the desired point for analysis. The other compartment contains a solution of the material being tested in the absence of reagent. In certain instances, one or more reagents can be added to this latter solution, provided the reagents do not carry the reaction to completion or do not adversely affect, in any other way, the optical analysis. This latter solution is called a "critically incomplete blank" and will enable the analytical system to correct for the effects of the sample and the reagents added. To maintain the detection mechanism in calibration standard solutions are passed through the detection mechanism at intervals so the latter can adjust for deviations which occur during operation.

Figure 7:
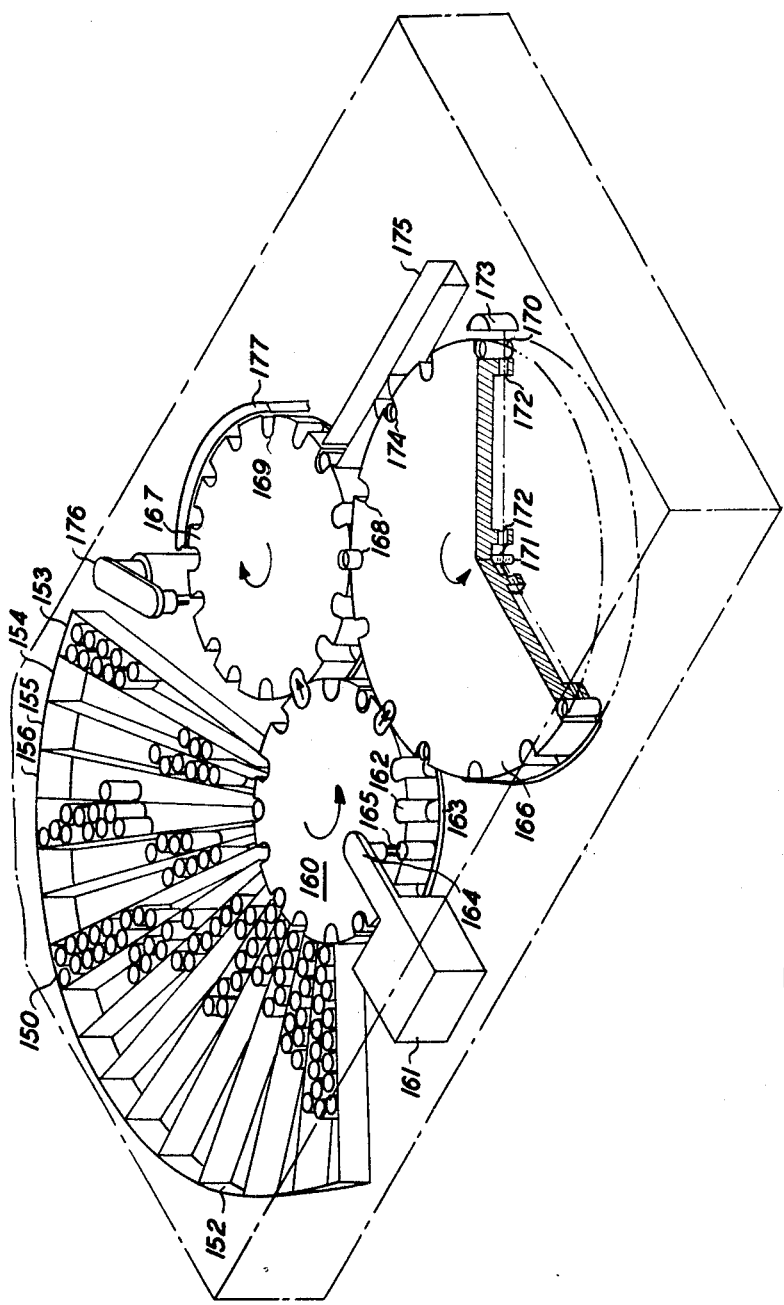
FIGURE 7 is an enlarged perspective view of an automatic analytical system as contemplated by the present invention.

Referring to FIGURE 7, there is seen an automatic analyzer as contemplated by the present invention. Disposable containers 150 are stored in magazine 152 which is partitioned into a plurality of compartments 153, 154, 155, 156, etc. As previously indicated, each container 150 is a prepackaged chemical testing unit. Only like units are stored in the same compartment with other containers. Transportation means in the form of a grooved wheel 160 is provided to move the containers from the magazine 152 to the sample addition station 161. Wheel 160 has a plurality of grooves 162 disposed about the periphery thereof. An end wall 163 is provided at the bottom of each groove to hold the containers within the grooves. When using the disposable container of FIGURES 5 and 6 appropriate ledges are provided to support the container by flange 58. Tangential to transportation means 160 are two incubation wheels 166 and 167. Incubation wheels 166 and 167 also have a plurality of grooves 168 and 169, respectively, disposed about their periphery. A retaining wall 177 is positioned about the outer periphery of each grooved wheel in parallel spaced relationship to prevent the containers from accidentally falling out of the grooves after being positioned therein. The retaining wall is shown about wheel 167 but, for sake of simplicity, has been omitted from around wheels 160 and 166. Containers 150 are loaded onto transporation means 160 by any suitable means in response to an electrical signal. Once properly positioned on wheel 160, the container passes to the sample addition station 161 where the appropriate amount of diluted sample is added to the unit. In accordance with an appropriate input signal, sample addition station 161 withdraws the proper amount of sample from the initial sample-containing vessel (not shown) and deposits the sample along with the appropriate amount of diluent through conduit 164 into the reaction compartment within the container. Probes 165 are also provided to force reagents out of their storage chambers or top-hats into the reaction compartment. Each incubation wheel can have a different diameter and be revolving at a different rotational speed to provide a variety of retention times between the time the disposable container is first placed on the wheel to such time as it passes through the detection station. For example, incubation wheel 166 can have a ten minute incubation while wheel 167 has an incubation time of thirty minutes. Thus, a container can take, in the system as shown, one of three routes. First, it can be routed from wheel 160 to wheel 167, spending 30 minutes on wheel 167, and then be transferred to wheel 166 where approximately 10 minutes more are spent in incubation. Secondly, the container can be transferred from wheel 160 to wheel 166 for a 10 minute incubation or, finally, it can be transferred from wheel 160 to wheel 167 for a 30 minute incubation. What path will be chosen will depend upon the necessary incubation periods for the assay, as well as the manner in which the system is programmed to handle a plurality of assays simultaneously. It is preferred that transportation means 160 be revolving sufficiently rapidly so that little time is spent by the disposable container on that wheel after sample and reagent addition but before transfer to the incubation wheel. Further wheels can be provided along the outer periphery of incubation wheels 166 and 167 so that the disposable container can be sequentially passed through them to lengthen the incubation period. The disposal container, having the diluted sample and reagents mixed in the reaction compartment, is maintained on transportation wheel 160 until the groove comes in communication with a corresponding groove in an adjacent incubation wheel. At that time, the container is transferred from the groove in the transportation wheel to the groove in the incubation wheel by air pressure, a transfer ram or any other suitable transfer mechanism. While the disposable container is in the incubation station it passes through detection station 170. Light from source 171 passes through channels 172 in wheel 166, the cuvette compartment in the disposable container, and finally falls upon the detection unit, such as a photoelectric cell, 173. The magnitude of the electrical signal through photocell 173 is proportional to the light transmittance of the reaction product in the cuvette. This output signal which is indicative of the amount of a particular constituent in the sample is fed to a control panel and storage device for its storage. Means are also provided to identify the particular sample as being from a particular patient as well as the test being run thereon. Such information is also taken from the disposable container at this time and stored with the analytical data in similar manner. As the incubation wheel 166 revolves, the disposable container comes to a position 174 where it is ejected from the wheel into disposal station 175. A disposable container transferred to wheel 167 follows a similar procedure. If necessary, a disposable container can remain in a groove on this, or any other, wheel for more than one revolution. Thus, several readings can be taken at regular intervals while the container is on the wheel. In this manner, the rate of a chemical reaction can be determined and transformed into meaningful data. For example, after numerous readings, the data so obtained can be correlated and reduced to a curve which defines the rate at which a chemical reaction within the reaction compartment is proceeding For certain reactions, this rate is proportional to the concentration of the known constituent. Additionally, with respect to wheel 167 there is shown a secondary reagent addition station 176 provided for the addition of those reagents which were not emptied into the disposable container by probes 165 at station 161. As many secondary stations can be provided as are necessary for the particular procedures programmed into the system and they may be positioned wherever reagents need to be added. By providing more than one reagent addition station, it is possible to sequentially add reagents at the appropriate time in a particular analytical procedure.

Figure 8:
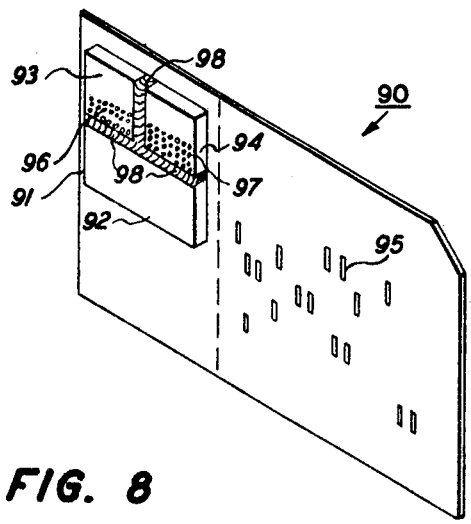
FIGURE 8 is a perspective view of a further exemplary disposable container of the present invention.

A further exemplary disposable container is seen in FIGURE 8 wherein a record data card 90 has on one surface thereof a reaction container 91 sectioned into a plurality of compartments 92, 93, and 94. Strong seals are provided along the outer periphery of the container to securely bond it to the underlying substrate. Such seals can be, for example, strong thermally bonded heat seals or strong adhesive seals. Under application of a moderate force, as will hereinafter be described, these bonds will not rupture with the result that the reaction container remains securely fastened to the record card. Separating compartments 92, 93, and 94 are "weak" seals 98 which under the application of heat, vacuum, flexing or pressure are opened thereby providing a single compartment having the powdered reagents loosely mixed in the bottom thereof. Such seals can be either heat seals or weak adhesive seals. Appropriate data 95 is stored on the remaining portion of the record card in a form well known to those skilled in the art and which will, in conjunction with the appropriate means in the automatic analyzer, cause the proper analysis to be conducted on the sample and to identify the sample and test results as being of a particular patient. Powdered reagents 96 and 97 are stored, respectively, in compartments 93 and 94. If necessary, it is possible to store additional reagents in lower compartment 92. The desired number of compartments is determined by the number of reagents required for a particular analysis and the compatibility of mixtures of reagents. A plurality of reagents can be stored in a single compartment provided they are compatible throughout a long shelf life.

In operation, one or more of the reagent-containing compartments is manipulated to open the compartments and cause them to be in communication with lower compartment 92. The powdered reagent stored therein is deposited into the lower compartment and the diluted sample solution is injected through a needle into the compartment. Mechanical members or fingers (not shown) can be provided to reinforce a particular weak seal so that upon application of force to the reaction container, that particular weak seal will not be broken. In this manner, selective compartments can be emptied of their contents sequentially thereby adding flexibility to procedures which can be utilized with this system. The unit is then passed through a mixing and incubation station where it is held for a time sufficient to culminate the desired chemical reaction and thereafter it is passed to an optical read-out station, wherein one or more of the physical properties of the reaction mixture is monitored.

Figure 9:
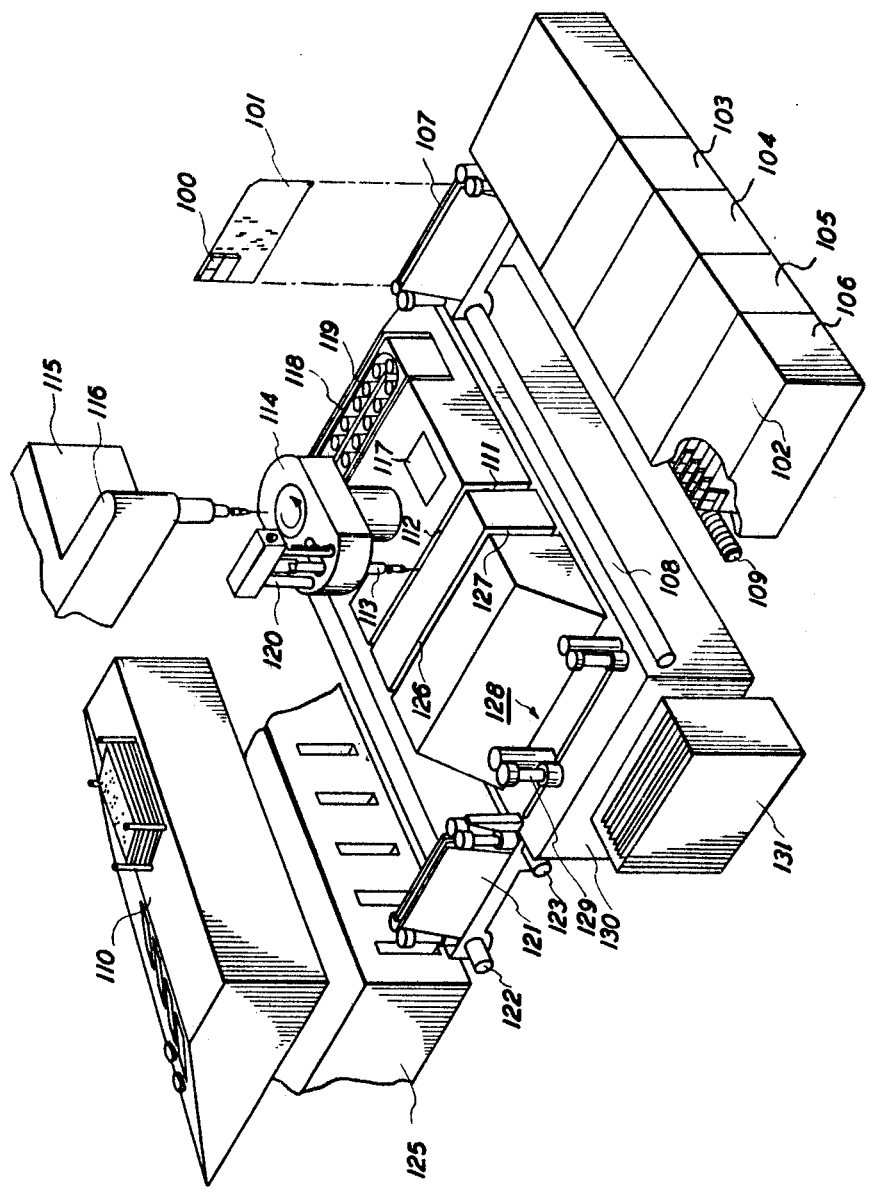
FIGURE 9 is a perspective view of an automatic analytical system utilizing the data card-type disposable container of FIGURE 7.

A fully automated analytical system using the flexible container of FIGURE 8 is shown in FIGURE 9 wherein a prepackage storage magazine 102 is partitioned into a plurality of compartments 103, 104, 105, 106, etc. As previously indicated, each reaction container 100 stored on data card 101 is a prepackaged chemical testing unit. Only like units are stored in the same compartment with other reaction containers. Transportation means in the form of a traversing card handler 107, reciprocating on runners 108 and 109, is positioned adjacent the opening of the magazine 102 for selecting, in response to a given input signal from control panel 110, the appropriate data card 101 for conducting a desired analysis. Appropriate samples are placed in the sample magazine 118 with each sample having its own separate identification. As shown, disposable syringe 113 is carried by revolving syringe head 114 which moves in a counterclockwise direction. An unused syringe first passes to diluent reservoir 117 where the proper amount of diluent, normally distilled water, is drawn up into the syringe. Turning counterclockwise, the diluent carrying syringe passes to magazine 118 where a small amount of sample is drawn into the syringe proper from a sample vessel 119. Simultaneously, a machine-readable number on the sample vessel is read and transferred to control panel 110. Control panel 110 compares this number with other data which has previously been stored therein and commands the proper test to be conducted upon this sample. Traversing card handler 107 moves to a position adjacent the proper compartment in the prepackage storage magazine 102 and picks up a data card 101 having the appropriate container 100 for conducting the desired analysis. The traversing card handler then moves to a position adjacent the opening 111 in sample addition station 112. The data card is moved into sample addition station 112 where disposable syringe 113, after revolving 180° on head 114 from station 118, is positioned above the reaction container on the card. Syringe 113 is lowered by gear means 120 until the needle penetrates reaction container 100 and the diluted sample has been deposited therein. The sample material is injected into the reaction container either prior to, during, or after the appropriate reagents have been emptied from their storage areas into the lower compartment. If desired, mechanical members or fingers can be provided in the sample addition station which can be programmed to sequentially empty the contents of the reagent compartments into the bottom portion of the reaction container. Optionally, this diluted sample can be injected into the reaction container and thereafter diluted with distilled water from a separate injection source (not shown). At this time, a blank reading may be made by the detection unit if desired. Unused syringes are stored in a syringe storing area 115 and are dropped by syringe dispenser 116 into open spaces in revolving syringe head 114 vacated by the disposal of used syringes. It is preferred that a disposable syringe be used for each sample material, thus, if a plurality of tests are to be conducted on a particular sample it will only be necessary to dispose of the syringe after the completion of the transfer of the plurality of aliquots. However, if the syringe is properly cleaned and steps are taken to prevent cross-contamination, each syringe can be used for as long as desired. Card 101 is then ejected from sample addition station 112 onto a second traversing card handler 121 reciprocating on runners 122 and 123. The traversing card handler deposits the card in the far-end entrance of incubation station 125. Prerecorded data on the data card determine when the card should leave the incubator and, consequently, the reaction container is held within the incubation station for a period of time sufficient to culminate the chemical reaction. At that point in time, the card is ejected from incubation station 125 and picked up by traversing card handler 121. For added flexibility, an additional traversing card handle (not shown) can be provided solely for the withdrawal of the data cards from the incubation station and the introduction thereof into the detection unit. If further reagents need to be added following the first incubation cycle, the data card is taken by traversing card handler to a reagent-addition station (which can be station 112 or a separate station) to receive additional reagents. The data card can then be placed back in incubation station 125 or sent directly to the detection station. From the traversing card handler 121 the data card is passed into slot 126 defining the detection station wherein one or more physical characteristics of the reaction mixture is monitored to obtain the desired analytical data. Within the detection station the analytical data obtained is immediately transferred to the data card to provide a complete record for future reference. After detection, the card is ejected from the detection station 126 at opening 127 and picked up by a traversing card handler. Once again, for added flexibility, a traversing card handler for solely picking up ejected cards from the detection zone can be provided. The data card is then taken to disposal station 128 where a card slicer 129 removes the portion of the card supporting the reaction container. The reaction container supporting portion of the card falls into a disposal cavity 130 while the data containing portion of the card is dropped into storage container 131. As shown, storage container 131 is not integrated with control unit 110 but it can be easily positioned to be an element thereof. If so positioned, the cards can be automatically read and data stored in an appropriate memory device for subsequent reference. In the device as described, the cards are taken by a technician and transferred to the control unit where the information contained on the data card is stored until such time as required by the physician.

After the first card for a given analysis has been deposited in the sample addition station 112, the traversing card handler 107 will immediately move to the proper compartment adjacent the magazine to receive a second card, and the entire process will be repeated for that particular analysis. It should be appreciated that there will be many cards at various locations within the system simultaneously. By simultaneously, it is not meant that the beginning and end of each analysis coincides with the beginning and end of other analyses but rather that there is a substantial overlapping of the operational steps involved. Thus, one card will be in the sample addition station while another will be in the detection station. Obviously, the analysis of the sample in the card in the detection station will be completed long before the completion of the sample now being deposited. However, since there is an overlapping of operational steps, such tests are considered to be simultaneous within the meaning of the word as used in this application.

Figure 10:
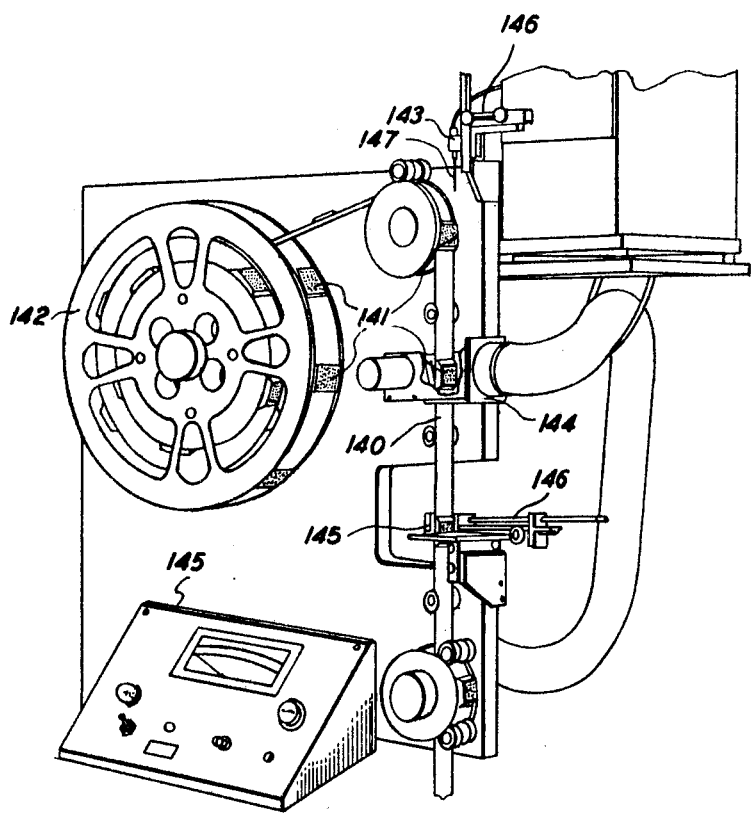
FIGURE 10 is a perspective view of still a further automatic analytical system as contemplated by the present invention wherein the disposable containers are carried by an elongated tape.

Referring to FIGURE 10, there is seen an alternate embodiment of the present invention wherein the supporting substrate for the disposable container comprises an elongated tape 140 having a plurality of containers 141 stored thereon. The container-supporting tape is wound upon a storage reel 142 and threaded through a sample addition station 143, a mixing and incubation station 144, an optical read-out station 145 and thereafter finally deposited in a disposal station (not shown) or wound upon a take-up reel (also not shown). Tape 140 has appropriate sprockets therein, much like movie film, so it can be indexed from position to position. The supporting tape can have a magnetic coding or other means of printing in binary language. Sensors can read the recorded data and command various portions of the system to perform desired operations on the disposable container. Data, such as patient identification numbers and analytical results can be recorded thereon for storage and subsequent read-out. Ratchet and pawl mechanisms 146 are provided to move diluted sample injector 147 and detection means into and out of position. As is apparent this device does not have the flexibility of more fully automated systems, such as the one shown in FIGURE 7. Each particular sample must wait its turn for analysis and only one type of test or a fixed series of tests is normally programmed into a single reel (including the overall apparatus). However, for more flexible multiple testing a bank of reels is provided with each reel having a different testing prepackage so that a plurality of different tests are performed simultaneously (1) on aliquoted portions of the same sample or (2) on different injected samples. In this case the reels are mounted adjacent each other and the sample injector traverses back and forth across the reels.

Since it is expected that the disposable containers will be stored for long periods of time with the prepackaged reagents therein, the materials which make up the disposable containers are selected so as not to contaminate or assist in the degeneration of the prepackaged chemicals. It is preferred that the construction materials be chemically inert or, at least, chemically inert to the reagents and any other chemicals which might, in a clinical environment, come in contact with the container. Once the reagents are prepackaged, the outer layer of the storage compartment will act as a barrier material preventing passage of contaminating factors. Alternatively, a plurality of disposable containers which do not have especially good long term barrier properties can be packaged together within a barrier material which will preserve the initial properties of the packaged reagents. Suitable materials include the fluorocarbons, such as trifluoromonochloroethylene, polytetrafluoroethylene, and Fluorothene (a product of Union Carbide Corporation); polyolefins, such as polyethylene, Ionomer (a cross-linked polyethylene based polymer produced by Du Pont Corporation), and polypropylene; polystyrenes; polyvinyl chloride; polyethylene terephthalate; and polycarbonates. During use, the reaction mixture will be in the cuvette compartment for a relatively short period of time in comparison to the overall storage life of the prepackage unit; therefore, it is not necessary to provide the same stringent requirements for the material comprising the cuvette compartment as those set forth for the reagent storage section. The cuvette material is preferably inert to the reaction mixture under the ambient conditions which exist during the analysis. The material should also be non-porous thereby preventing the seepage of portions of the reaction mixture from the compartment. Optically, the materials should transmit a substantial portion of the light incident thereupon. It is preferred that the material be clear though a material with uniform haze may also be employed. Suitable materials include polypropylene, polyvinylchloride, polystyrene, polycarbonates, cellulose acetate, cellulose propionate, and cellulose butyrate. It is not always possible to provide a material having all the properties necessary for storage as well as having good optical properties for the cuvette. Accordingly, the reagents can be stored in a section constructed of one material and the cuvette is made out of a different material. The two sections are then united, in any suitable manner, to provide the prepackaged unit. It should also be noted that two or more layers can be laminated together to provide a storage chamber having the desired barrier qualities.

The disposable containers of FIGURES 1-4 have been made with tetrafluoroethylene and polypropylene upper sections for storing the reagents therein and polyethylene, polypropylene, polyvinyl chloride, polystyrene and cellulose propionate cuvettes. Each of these latter materials is sufficiently inert so as not to be affected by the reaction mixture during the incubation period. Each material transmits a sufficient portion of the light incident thereupon for analytical purposes. Polypropylene, however, is the least clear of the materials transmitting only about 80% and having a uniform haze. As previously indicated, since the haze is uniform and a substantial proportion of the incident light is transmitted this material can be used although it is not the preferred material from an optical viewpoint. Polyolefins, such as polyethylene or polypropylene, are suitable materials for use as the plugs within each of the reagent-storing recesses. An exemplary description of the materials utilized in a preparation of a disposable container as described in FIGURES 5 and 6 include polyolefins for the reagent-storing section and the restraining layer holding the reagents in the top-hat chambers, and cellulose propionate as the cuvette. The restraining layer, as noted above, can be made from the same material used in producing the reagent storage section. To achieve proper shearing the layer should be approximately an order of magnitude thinner than the storage layer.

The manner of producing the disposable containers of the present invention is not considered part of this invention. In general, however, any suitable method can be used which will produce a container having the desirable characteristics. For example, injection molding can be used to obtain a rigid cuvette having good optical properties. In conjunction with this injection molded cuvette, an injection molded polypropylene top can be used for the storage of the necessary reagents. Thermoforming operations, such as pressure forming or vacuum forming, can also be used to produce portions of the disposable container which have intricate designs. Pressure forming, however, is preferred because it is possible by using high pressure air to get the plastic material into areas where it cannot be drawn by a vacuum.

The reagents stored within the chambers in the disposable container can be either in solid or liquid form. Liquid storage is not as desirable, however, because there is a greater propensity towards chemical reaction, either with the storage wall or with material permeating therethrough. Additionally, liquid materials are generally known to be more sensitive to light and other portions of the electromagnetic spectrum and, therefore, degrade faster unless adequate filters are provided to eliminate deleterious radiation. Accordingly, it is preferred to store the reagents in solid form whenever possible. When stored in the solid state, the reagents can be in powdered or tableted form, either singly or in combination with other compatible reagents. A disadvantage of storing two or more powdered reagents together is the extreme amount of surface area available for chemical reaction. Even though the materials are relatively non-reactive, prolonged storage under such conditions may have a deleterious effect on the reagent mixture. In such cases it would be best to package the materials separately or to package them in tablet form. Tableting sufficiently reduces the contact surface area between reagents as only point contact, in essence, is achieved when one spheroidal (or substantially spheroidal) tablet is placed on top of another. The actual form of the tablet is not critical but selection of a proper shape (for example to give minimum contact) may prove advantageous in increasing the storage life of the prepackaged reagents. Additionally, by providing detents in the storage chamber and snapping the tablets into place a plurality of tablets can be placed in the same chamber but spaced from each other to eliminate contact for possible chemical reaction. In this approach, if sufficiently strong detents are provided the restraining layer of FIGURES 5 and 6 or the plugs of FIGURES 1-4 can be omitted in analytical procedures wherein all reagent tablets are dropped into the reaction compartment before mixing or it is not disadvantageous to have the reaction mixture splash upon a tablet which has not been dropped into the mixture. Tableting provides a feasible method for accurately depositing the proper amount of chemical reagent within a particular chamber. Severe dust and contamination problems may exist when a plurality of different powdered chemicals are being deposited into storage chambers which are a fraction of an inch apart. When a tableting form of reagent addition is utilized these problems are, at least, eliminated from the packaging line and placed in their own environment where they can be dealt with separately. It is, of course, necessary to use only those materials in the tableting process which will not have a deleterious effect on the analytical procedure. In any case, the reagents, whether stored in liquid or dry form, must be put into the reagent chambers in a measured amount, the tolerance of which is determined by the given analytical procedure. Finally, storage of the reagents, whether they are in powdered, tableted or liquid form, may be in a dry inert gas atmosphere, such as nitrogen. By providing an inert atmosphere, the relative chemical activity of the reagents are significantly reduced thereby increasing the shelf life of the prepackaged unit.

While the invention has been described with reference to preferred embodiments thereof, it will be understood by those skilled in the art that various changes in form and details may be made without departing from the true spirit and scope of the invention. Many alternate container designs can be conceived which will achieve the advantageous results herein disclosed. While one embodiment has been shown for securing the upper section of FIGURE 5 to the lower section, many other ways of achieving this result can be utilized. For example, the upper section can be heat sealed to the lower section or the sections can be crimped together to provide a unitary structure. Further, many kinds of detection techniques can be used in conjunction with the disposable containers of the present invention. For example, after the sample and appropriate chemicals have been added to the reaction container, in the manner previously described, a probe can be lowered into the reaction mixture and a fraction of this solution aspirated in the flame of a flame photometer. Detection proceeds using well known flame photometric technology. Besides flame photometry, other analytical techniques can be utilized. Thus, instead of passing a beam of light through the reaction mixture to a detection means positioned on the opposite side of the reaction mixture, an immersion probe, such as the one shown by Baruch in U.S. 3,263,553, can be passed in each reaction mixture to analyze for varying amounts of the known constituent. If of the proper size, the probe can be inserted through a vacated reagent-storage chamber or through channel 22 of FIGURES 1–4. In this latter embodiment, the aperture in flange 24 is so designed as not to interfere with the optical analysis.

Further, information or data can be stored on the disposable reaction containers of the present invention for any of a number of reasons. For example, data can be stored thereon for recording the nature of the prepackaged analytical procedure; for instructing the associated analytical apparatus to perform certain operations, such as secondary reagent addition at a specific time; for instructing the apparatus to provide specific ambient conditions during incubation; etc. Suitable forms of information storage include punched holes, magnetic coding, notches, etc. By providing a sufficient number of information bits, all the necessary records and instructions can be stored on the disposable reaction container for future reference.

It is contemplated that any analytical procedure can be adapted to the herein disclosed invention. While the apparatus and systems herein disclosed is particularly suitable for routine blood chemistry, such as glucose, blood urea nitrogen, albumin, bilirubin, total protein, etc., numerous other analytical tests which are run periodically in any chemical environment can be automatically performed in accordance with the aforesaid disclosure.

Accordingly, all substitutions, additions, and modifications to which the present invention is readily susceptible, without departing from the spirit and scope of this disclosure, are considered part of the present invention.

What is claimed is:

1. A disposable reaction container comprising a lower section having at least one compartment for the admixing of materials added thereto, a storage section having a plurality of separate reagent storage chambers adapted for communication with each of said admixing compartments, and restraining means to prevent the premature movement of prepackaged reagents from said plurality of storage chambers, said restraining means comprising a shearable layer positioned between said storage section and said admixing compartment section adjacent the openings of said plurality of storage chambers, said shearable layer being sufficiently strong so that it will shear only below a particular storage chamber when application of force is made thereto from within said storage chamber, at least a portion of each admixing compartment being sufficiently optically transparent so that said compartment can be utilized as a cuvette for optical analysis.

2. The disposable reaction container of claim 1 having data stored thereon.

3. The disposable reaction container of claim 1 wherein said storage section comprises a layer having a plurality of reagent-storing chambers formed therein.

4. The disposable reaction container of claim 1 wherein said upper storage section comprises a unitary plastic member having formed therein said plurality of separate reagent storage chambers.

5. The disposable reaction container of claim 1 wherein said optically transparent portion of each admixing compartment through which optical analysis is made is substantially vertical when said container is in position for optical analysis.

6. The disposable reaction container of claim 1 wherein said admixing compartment section has a plurality of separate admixing compartments surrounded about the upper perimeter thereof by a flange, adjacent ones of separate admixing compartments being separated by a portion of said flange which acts as a barrier to prevent the admixing of materials added to adjacent admixing compartments.

7. The disposable reaction container of claim 1 wherein said storage section has a flange which encircles the lower perimeter thereof and surrounds the plurality of reagent storage chambers, said flange being wider along one longitudinal portion thereof and adapted for the storage of information thereon.

8. The disposable reaction container of claim 1 wherein there are a plurality of admixing compartments and a plurality of separate reagent storage chambers adjacent each of said admixing compartments.

9. The disposable reaction container of claim 8 wherein each of said admixing compartments has side walls and a bottom wall and at least those side walls disposed parallel to the longitudinal axis of said container being substantially vertical and sufficiently optically transparent for optical analysis therethrough.

10. The disposable reaction container of claim 1 wherein said restraining means comprises a thin plastic layer.

11. The disposable reaction container of claim 10 wherein said storage section, said shearable layer and said admixing compartment section are heat sealed together.

12. The disposable reaction container of claim 10 wherein said storage section, said shearable layer and said admixing compartment section are bonded together.

13. The disposable reaction container of claim 10 further including a flange surrounding the upper perimeter of said separate reaction compartments, adjacent ones of said separate reaction compartments being separated by a portion of said flange which acts as a barrier to prevent the admixing of materials added to adjacent reaction compartments.

14. An automated analytical system including the disposable reaction container of claim 1, a station for the addition of sample to an admixing compartment, at least one station for the addition of at least one reagent stored within said disposable container to said admixing compartment, a detection station for monitoring at least one of the physical properties of the reaction mixture within said disposable container, and means to transport said disposable reaction container through each of said stations to said detection station.

15. The automated analytical system of claim 14 further including a station for the storage of a plurality of different disposable reaction containers, each different reaction container representing one prepackaged chemical testing unit, and said section being partitioned into a plurality of compartments with each of the different reaction containers being stored in a separate compartment with only like prepackaged reagent-storing containers.

16. The automated analytical system of claim 14 further including a mixing and incubation station wherein the reaction mixture is maintained within the admixing compartment of the disposable container for a period of time sufficient to bring the reaction mixture to the desired state for analysis.

17. The automated analytical system of claim 14 further including a station for the dilution of a sample to be analyzed to the appropriate concentration.

18. The automated analytical system of claim 14 having a plurality of reagent addition stations.

19. The automated analytical system of claim 14 including a detection station associated with said sample addition station.

20. The automated analytical system of claim 14 further including a detection station associated with a reagent addition station.

21. The automated analytical system of claim 14 wherein said disposable container has data stored thereon.

22. The automated analytical system of claim 14 wherein said disposable reaction container has a plurality of admixing compartments to which materials are added, the additions to each of said admixing compartments being such that a difference in absorbance results, said detection station including means for measuring the absorbance of the material within each admixing compartment and means to derive a final analytical result based upon the measured absorbance differences.

23. A disposable reaction container comprising a lower section having a plurality of separate reaction compartments, a section for the storage of prepackaged reagents, said storage section having a plurality of separate reagent storage chambers adapted for communication with each of said reaction compartments, and restraining means to prevent the premature movement of prepackaged reagents from said plurality of storage chambers.

24. The disposable reaction container of claim 23 wherein each of said reaction compartments has at least one set of opposite side walls which are vertically disposed.

25. The disposable reaction container of claim 23 wherein said restraining means comprises detents within said reagent-storing chambers for holding tableted reagents within said chambers.

26. The disposable container of claim 23 further including a magnetic stirring bar in each of said admixing compartments.

27. The disposable container of claim 23 further including an additional storage chamber in said storage section adjacent each of said plurality of admixing compartments, each additional chamber being adapted for the storage of a magnetic stirring bar therein.

28. The disposable reaction container of claim 23 wherein said storage section comprises a unitary plastic member having formed therein said plurality of separate reagent storage chambers.

29. The disposable reaction container of claim 23 further including a flange surrounding the upper perimeter of said separate reaction compartments, adjacent ones of said separate reaction compartments being separated by a portion of said flange which acts as a barrier to prevent the admixing of materials added to adjacent reaction compartments.

30. The disposable reaction container of claim 23 wherein said restraining means comprises a shearable layer sandwiched between said storage section and said lower reaction compartment section adjacent the openings of said plurality of storage chambers, said shearable layer being sufficiently strong so that it will shear only below a particular storage chamber when application of force is made thereto from within said storage chamber.

31. The disposable reaction container of claim 23 wherein said storage section has a flange which encircles the lower perimeter of said storage section and surrounds the plurality of reagent storage chambers, said storage section flange being wider along one longitudinal portion thereof and adapted for the storage of information thereon.

32. An automated analytical system including the disposable reaction container of claim 23, a station for the addition of a sample aliquot from a sample storage site to each of said reaction compartments, a reagent addition station including first means for the addition of at least one reagent stored within said disposable container to at least the sample-containing reaction compartment, and second means for the addition of at least one further reagent stored within said disposable container to at least the non-sample-containing reaction compartment such that a difference in the absorbance characteristics of each reaction mixture will result, a detection station for monitoring at least one of the physical properties of each reaction mixture within each reaction compartment and deriving a final analytical result based upon the information obtained therefrom, and means to transport said disposable reaction container to each of said stations to said detection station.

33. The disposable reaction container of claim 23 further including a channel passing through said upper section and extending into said admixing compartment.

34. The disposable reaction container of claim 33 wherein said channel terminates in an inwardly extending aperture-defining flange.

35. The disposable reaction container of claim 23 wherein at least a portion of each reaction compartment is sufficiently optically transparent so that each compartment can be utilized as a cuvette for optical analysis.

36. The disposable reaction container of claim 35 wherein the optically transparent portion of each reaction compartment comprise at least those portions of the substantially vertical walls disposed substantially parallel to the longitudinal axis of the disposable container.

37. The disposable reaction container of claim 23 wherein said restraining means comprises a thin plastic layer positioned between said reagent storage section and said lower reaction compartment section.

38. The disposable reaction container of claim 37 wherein said storage section, said restraining layer and said lower reaction compartment section are bonded together.

39. An automated analytical system including the disposable reaction container of claim 23, a station for the addition of a sample aliquot from a sample storage site to one of said reaction compartments, at least one station for the addition of at least one reagent stored within said disposable container to said sample-containing reaction compartment and at least one other reaction compartment, a detection station for monitoring at least one of the physical properties of each reaction mixture within each reaction compartment and deriving a final analytical result based upon the information obtained therefrom, and means to transport said disposable reaction container through each of said stations to said detection station.

40. The automated analytical system of claim 39 wherein said additions to each of said reaction compartments are such that a difference in absorbance results, said detection station includes means for measuring the absorbance of the reaction mixture within each reaction compartment and means to derive a final analytical result based upon the measured absorbance differences.

41. The automated analytical system of claim 39 further including a second station for the addition of at least one further reagent stored within the disposable container to at least one of said reaction compartments.

42. An automated analytical system including the disposable reaction container of claim 23, a station for the addition of a sample aliquot from a sample storage site to each of said reaction compartments, at least one station for the addition of at least one reagent stored within said disposable container to at least one reaction compartment, a detection station for monitoring at least one of the physical properties of each reaction mixture within each reaction compartment and deriving a final analytical result based upon the information obtained therefrom, and means to transport said disposable reaction container through each of said stations to said detection station.

43. The automated analytical system of claim 42 wherein said additions to each of said reaction compartments are such that a difference in absorbance results and said detection station includes means for measuring the absorbance of the reaction mixture within each reaction compartment and means to derive a final analytical result based upon the measured absorbance differences.

44. The automated analytical system of claim 42 wherein the added reagent is added to a single sample-containing reaction compartment only.

45. The automated analytical system of claim 42 wherein reagents are added to each sample-containing reaction compartment under circumstances which cause a difference in the absorbance characteristics of each reaction mixture to result.

46. The automated analytical system of claim 42 wherein each of said reaction compartments is sufficiently optically transparent so it can be utilized as a cuvette for optical analysis, said detection station including means for passing a beam of electromagnetic radiation through each of said reaction compartments, means to measure the absorbance of each material within each reaction compartment and means to derive a final analytical result based upon the measured absorbance differences.

47. The automated analytical system of claim 42 further including a second station for the addition of at least one further reagent stored within the disposable container to at least one of said reaction compartments.

48. The automated analytical system of claim 47 wherein said detection station includes means for measuring the absorbance of the reaction mixture within each reaction compartment and means to derive a final analytical result based upon absorbance differences.

49. A disposable reaction container comprising a lower section having a plurality of separate compartments for the admixing of materials added thereto, said lower section terminating in a flange which encircles the upper perimeter of said plurality of admixing compartments, an upper storage section securely mounted on said upper section having a plurality of separate reagent storage chambers adjacent each of said plurality of admixing compartments, and restraining means to prevent the premature movement of prepackaged reagents from each of said reagent storage chambers.

50. The disposable container of claim 38 wherein the restraining means comprises a shearable layer disposed adjacent the openings of said plurality of reagent storage chambers, said restraining layer being sufficiently strong so that it will shear only below a particular reagent storage chamber when application of force is made thereto from within said storage chamber.

51. The disposable reaction container of claim 49 wherein said upper section is heat sealed to the flange of said lower section.

52. The disposable reaction container of claim 49 having data stored thereon.

53. A disposable chemical testing unit comprising a supporting carrier comprising a elongated tape, a plurality of reaction containers securely bonded to one surface of said tape, each of said containers being sectioned into a reaction compartment and a plurality of reagent storage compartments, said compartments being separated from each other by walls weakly bonded to said tape so that said compartments can be brought into communication upon destruction of the weakbonds, and the walls defining each reaction compartment being optically transparent so that each of said compartments can be utilized as a cuvette for optical analysis.

54. The disposable testing unit of claim 53 wherein appropriate data is stored on said tape for instructing an associated analytical apparatus to perform a desired chemical analysis on each of said reaction compartments comprising said disposable testing unit.

55. The disposable testing unit of claim 53 wherein the elongated tape is optically transparent so that a beam of light can be passed through said tape, the wall of a reaction compartment parallel to said tape, and the reaction mixture within said reaction compartment between said wall and said supporting tape.

56. An automated analytical apparatus comprising means to carry a plurality of reagent-storing, disposable chemical testing containers; means to transfer at least a portion of a sample from a sample storage site to a reaction compartment within one of the plurality of disposable containers; at least one means for the addition of at least one reagent stored within the disposable container to the reaction compartment; means further along the path of travel of said carrying means to monitor at least one of the physical properties of the reaction mixture within the reaction compartment; and means to advance said carrying means through said sample and reagent addition means to said monitoring means.

57. The automated analytical apparatus of claim 56 further including means to incubate the reaction mixture within the reaction compartment of the disposable container for a period of time sufficient to bring the reaction mixture to the desired state for analysis.

58. The automated analytical apparatus of claim 56 wherein said means to transfer sample portions includes means to dilute the sample portion added to the appropriate concentration.

59. The automated analytical apparatus of claim 56 wherein said reagent addition means includes means to place reagent-storing chambers of the disposable container in communication with the reaction compartment.

60. The automated analytical apparatus of claim 56 further including additional reagent addition means further along the path of travel of said carrying means.

61. The automated analytical apparatus of claim 56 wherein there are a plurality of monitoring means.

62. The automated analytical apparatus of claim 56 wherein said monitoring means includes a light source and a detection means, said detection means being positioned on the opposite side of the reaction mixture from said light source, said detection means being responsive to the variations in light transmittance caused by the different concentration of a known constituent in each reaction mixture.

63. The automated analytical apparatus of claim 56 further including means to eject a used disposable container from said carrying means into a disposal zone after the disposable container has passed through the monitoring means for the last time.

64. The automated analytical apparatus of claim 56 further including additional monitoring means associated with said apparatus in said sample transfer means.

65. The automated analytical apparatus of claim 56 further including additional monitoring means associated with said apparatus in said reagent addition means.

66. The automated analytical apparatus of claim 56 further including means to identify a particular disposable container as being from a particular patient and to correlate the analytical data obtained by said monitoring means with the patient identification data.

67. The automated analytical apparatus of claim 56 further including means to recycle an analyzed disposable container from said monitoring means back to said incubation means for further incubation prior to additional analysis.

68. The automated analytical apparatus of claim 56 further including at least one additional means for the addition of at least one reagent stored within the disposable container to the reaction compartment.

69. The automated analytical apparatus of claim 56 wherein said sample transfer means includes means to inject the sample into the reaction compartment of the disposable container.

70. The automated analytical apparatus of claim 69 wherein said sample injection means includes a revolving syringe head, a syringe holder supported by said syringe head, a magazine for the storage of disposable syringes, and indexing means to move said injection means into and out of the reaction compartment.

71. An automated analytical apparatus comprising a magazine for the storage of a plurality of different disposable reaction containers, means to add a material to be analyzed to a reaction compartment within a disposable container, at least one means for the addition of at least one reagent stored within said disposable container to the reaction compartment, means to monitor at least one of the physical properties of the reaction mixture within the disposable container, and means to transport the disposable container from said magazine through said material addition means and said reagent addition means to said monitoring means.

72. The automated analytical apparatus of claim 71 further including at least one additional means for the addition of at least one reagent stored within said disposable container to the reaction compartment.

73. The automated analytical apparatus of claim 71 wherein said magazine is partitioned into a plurality of storage compartments.

74. The automated analytical apparatus of claim 73 wherein said transport means includes means to select a particular disposable container from a storage compartment in said magazine and load the disposable container on said transport means.

75. An automated analytical apparatus comprising a magazine for the storage of a plurality of different disposable reaction containers, said magazine being partitioned into a plurality of storage compartments for the storage of different reaction containers with only like prepackaged reagent-storing containers being stored in any one compartment; means to add a material to be analyzed to a reaction compartment within a disposable container; at least one means for the addition of at least one reagent stored within the disposable container to the reaction compartment; means to incubate the reaction compartment of the disposable container at predetermined ambient conditions for a period of time sufficient to bring the reaction mixture to the desired state for analysis; means to monitor at least one of the physical properties of the reaction mixture within the reaction compartment; means to transport the disposable container from said magazine through said material addition means, said reagent addition means, and said incubation means to said monitoring means; and means to eject a disposable container from said storage compartment in said magazine and load the container on said transport means.

76. The automated analytical apparatus of claim 75 wherein said reagent addition means includes at least one probe and probe drive to force prepackaged reagent out of a reagent storage chamber in the disposable container.

77. The automated analytical apparatus of claim 75 wherein said incubation means surrounds at least a portion of said transport means.

78. The automated analytical apparatus of claim 75 wherein said transport means comprises a wheel having a plurality of container-supporting grooves disposed about the periphery thereof.

79. The automated analytical apparatus of claim 78 further including a retaining wall disposed about the periphery of said grooved wheel to prevent the disposable containers from falling out of said grooves.

80. The automated analytical apparatus of claim 78 wherein there are a plurality of container-supporting grooved wheels, said grooved wheels being in tangential relationship, and further including means to transfer a disposable container from a groove in one wheel to a groove in a wheel tangential thereto.

81. The automated analytical apparatus of claim 80 further including means to synchronously move said plurality of grooved wheels so that a reaction mixture within a disposable container will reach the monitoring means at the proper time for analysis.

82. An automated analytical apparatus comprising a magazine for the storage of a plurality of different disposable reaction containers, each of the containers being carried by a supporting member, said magazine being partitioned into a plurality of storage compartments for the storage of different reaction containers with only like prepackaged reagent-storing containers being stored in any one compartment, means to add a sample to be analyze to a reaction compartment within a disposable container, at least one means for the addition of at least one reagent stored within the disposable container to the reaction compartment, means to incubate the reaction mixture within the reaction compartment at predetermined ambient conditions for a period of time sufficient to bring the reaction mixture to the desired state for analysis, means to monitor at least one of the physical properties of the reaction mixture within the reaction compartment, a sample magazine for the storage of a plurality of instruction-bearing sample-containing vessels, means to read said instructions on the storage vessels and to eject the appropriate reagent container-supporting member from said storage compartment in said magazine, means to receive the support member from said storage compartment and transport the support member to said sample addition station and said reagent addition station, means to eject the support member from said sample addition station and said reagent addition station, means to receive the ejected support member from said sample addition means and said reagent addition means and transport the support member to said incubation means, means to eject the support member from said incubation means, means to receive the ejected support member from said incubation means and transport the support member to said monitoring means, and means to eject the support member from said monitoring means after analysis.

83. The automated analytical apparatus of claim 82 wherein said means to receive the support member from said sample addition means and said reagent addition means and the means to receive the support member from said incubation means are the same means.

84. The automated analytical apparatus of claim 82 wherein each receiver and transport means comprises a traversing support member carrier.

85. An automated analytical apparatus comprising a reel for the storage of an elongated tape having a plurlity of reagent storing containers supported thereon; means to add a sample to be analyzed to a reaction compartment within the reagent-storing container; means for the addition of at least one reagent stored within the container to the reaction compartment; means to incubate the reaction mixture within the reaction compartment at predetermined ambient conditions for a period of time sufficient to bring the reaction mixture to the desired state for analysis; means to monitor at least one of the physical properties of the reaction mixture within the reaction compartment; and means to advance the tape through sample addition means, said reagent addition means and said incubation means to said monitoring means.

86. The automated analytical apparatus of claim 85 wherein there are a plurality of wheels for the storage of elongated tapes, each tape having a plurality of like reagent-storing containers supported thereon, each reagent-storing container representing a prepackaged chemical testing unit to be used in a particular chemical analytical procedure, and means to index said sample addition means so that said sample addition means can be used to add sample to any one of the reagent-storing containers supported by the elongated tapes.

87. A disposable reaction container comprising a lower section having a plurality of separate reaction compartments, a section for the storage of prepackaged reagents, said storage section having at least one separate reagent storage chamber adapted for communication with each of said reaction compartments, and restraining means to prevent the premature movement of prepackaged reagents from said plurality of storage chambers, at least a portion of each reaction compartment being sufficiently optically transparent so that said compartment can be utilized as a cuvette for optical analysis.

88. The disposable reaction container of claim 87 wherein the optically transparent portion of each reaction compartment comprises at least those portions of the substantially vertical walls disposed substantially parallel to the longitudinal axis of the disposable container.

89. The disposable reaction container of claim 87 wherein said restraining means comprises a shearable layer sandwiched between said storage section and said lower reaction compartment section adjacent the openings of said plurality of storage chambers, said shearable layer being sufficiently strong so that it will shear only below a particular storage chamber when application of force is made thereto from within said storage chamber.

90. The disposable reaction container of claim 87 wherein said restraining means comprises a thin plastic layer positioned between said reagent storage section and said lower reaction compartment section.

91. The disposable reaction container of claim 90 wherein said storage section, said restraining layer and said lower reaction compartment section are bonded together.

92. An automated analytical system including the disposable reaction container of claim 87, a station for the addition of a sample aliquot from a sample storage site to at least one of said reaction compartments, at least one station for the addition of at least one reagent stored within said disposable container to at least said sample-containing reaction compartment, a detection station for monitoring at least one of the physical properties of the reaction mixture within each reaction compartment and deriving a final analytical result based upon the information obtained therefrom, and means to transport said disposable reaction contained through each of said stations to said detection station.

93. The automated analytical system of claim 92 further including a second station for the addition of at least one further reagent stored within the disposable container to at least one of said reaction compartments.

94. The automated analytical system of claim 92 wherein said detection station includes means for measuring the absorbance of the reaction compartment and means to derive a final analytical result based upon the measured absorbance differences.

95. A disposable reaction container comprising a lower section having a plurality of separate compartments for the admixing of materials added thereto, said lower section having a flange adjacent the upper perimeter thereof, each compartment comprising side walls and a bottom wall, at least said side walls disposed substantially parallel to the longitudinal axis of said disposable container being substantially vertical and sufficiently optically transparent so that each compartment can be utilized as a cuvette for optical analysis; an upper section supported on said flange and having at least one separate reagent storage chamber adjacent each of said admixing compartments; and restraining means adapted to prevent the premature movement of prepackaged reagents from each of said plurality of reagent storage chambers, said restraining means comprising a shearable layer sandwiched between said upper storage section and said lower admixing compartment section adjacent the openings of said plurality of storage chambers.

96. The disposable reaction container of claim 95 wherein there are a plurality of separate reagent storage chambers associated with each admixing compartment.

97. The disposable reaction container of claim 95 wherein adjacent admixing compartments are separated by a portion of said lower section flange which acts as a barrier to prevent the admixing of materials added to adjacent admixing compartments.

98. The disposable reaction container of claim 95 wherein said upper section has a flange which encircles the lower perimeter of said plurality of reagent storage chambers, said upper section flange being wider along one longitudinal portion thereof, the area circumscribed by said upper section flange being substantially rectangular and substantially equal to the area circumscribed by said restraining means and said lower section flange; said upper section, said restraining means and said lower section being securely mounted together; and said wider flange portion being adapted for the storage of information thereon.

99. A lower reaction compartment section of a disposable reaction container comprising a unitary member formed into a plurality of reaction compartments having a flange adjacent at least a portion of the upper perimeter thereof, each reaction compartment comprising four side walls and a bottom wall, said unitary member being formed from material of sufficient optical quality such that each compartment is sufficiently optically transparent so that each compartment can be utilized as a cuvette for optical analysis.

100. The lower reaction compartment section of claim 99 wherein at least those side walls disposed parallel to the longitudinal axis of said lower section are substantially vertical and sufficiently optically transparent for optical analysis therethrough.

101. The lower reaction compartment section of claim 99 wherein adjacent reaction compartments are separated by a portion of said flange which acts as a barrier to prevent the admixing of materials added to adjacent reaction compartments.

102. The lower reaction compartment section of claim 99 wherein said flange is wider along one longitudinal portion thereof and adapted for the storage of information thereon.

103. The lower reaction compartment section of claim 99 wherein said flange and said four side walls define an opening in said flange through which materials are added to each of said reaction compartments.

104. A lower reaction compartment section comprising a unitary member formed into a plurality of distinct compartments for the admixing of materials added thereto, each of said compartments being separated from adjacent compartments by barrier means adapted to prevent the admixing of materials added to adjacent compartments, said unitary member being formed of material of sufficient optical quality and being sufficiently optically transparent so that each compartment can be utilized as a cuvette for optical analysis.

105. A lower reaction compartment section of a disposable reaction container comprising a unitary member formed into a plurality of reaction compartments having a flange encircling the upper perimeter thereof, adjacent reaction compartments being separated by a portion of said flange which acts as a barrier to prevent the admixing of materials added to adjacent compartments, each reaction compartment comprising four side walls and a bottom wall, said flange and said four side walls of each reaction compartment defining an opening in said flange through which materials are added to each of said reaction compartments, at least those side walls disposed parallel to the longitudinal axis of said lower section being substantially vertical and sufficiently optically transparent so that optical analysis can be made therethrough.

106. The lower reaction compartment section of claim 105 wherein said flange is wider along one longitudinal portion thereof and adapted for the storage of information thereon.

107. An automated analytical apparatus comprising means to carry a plurality of reagent-storing, disposable chemical testing containers; means to transfer a sample aliquot from a sample storage site to a reaction compartment within one of the plurality of disposable containers; means for the sequential addition of a plurality of reagents stored within the disposable container to the reaction compartment; means further along the path of travel of said carrying means to monitor at least one of the physical properties of the reaction mixture within the reaction compartment; and means to advance said carrying means through said sample and reagent addition means to said monitoring means.

108. An automated analytical apparatus comprising means to carry a plurality of reagent-storing, disposable chemical testing containers; means to transfer a sample aliquot from a sample storage site to a reaction compartment within one of the plurality of disposable containers; first means for the addition of at least one reagent stored within the disposable container to the reaction compartment; second means for the addition of at least one further reagent stored within the disposable container to the reaction compartment; means further along the path of travel of said carrying means to monitor at least one of the physical properties of the reaction mixture within the reaction compartment; and means to advance said carrying means through said simple and reagent addition means to said monitoring means.

109. An automated analytical apparatus adapted for use with reagent-storing, disposable chemical testing containers, each container having a lower section having a plurality of reaction compartments, each reaction compartment being separated from an adjacent compartment by barrier means adapted to prevent the transfer of material between adjacent compartments, an upper storage section having a plurality of separate reagent storage chambers which can be placed in communication with each of said reaction compartments, and restraining means adapted to prevent the premature movement of prepackaged reagents from said plurality of storage chambers; said apparatus comprising means to carry a plurality of said disposable containers, means to transfer a sample aliquot from a sample storage site to at least one reaction compartment within one of the plurality of disposable containers, means for the sequential addition of at least two reagents stored within the disposable container to at least one of the reaction compartments, means further along the path of travel of said carrying means to monitor at least one of the physical properties of the reaction mixture within each reaction compartment, and means to advance said carrying means through said sample and reagent addition means to said monitoring means.

110. An automated analytical apparatus adapted for use with reagent-storing, disposable chemical testing containers, each testing container having a lower section having a plurality of reaction compartments separated from adjacent compartments by barrier means adapted to prevent the transfer of material between adjacent compartments, an upper storage section having a plurality of separate reagent storage chambers in communication with each of said lower compartments, and restraining means to prevent the premature movement of prepackaged reagents from said plurality of storage chambers; said apparatus comprising means to carry a plurality of disposable containers, means to transfer a sample aliquot from a sample storage site to at least one of the reaction compartments within one of the plurality of disposable containers, first means for the addition of at least one reagent stored within the disposable container to at least one of the reaction compartments, second means for the addition of at least one other reagent stored within the disposable container to at least one of the reaction compartments, means further along the path of travel of said carrying means to monitor at least one of the physical properties of the reaction mixture within each reaction compartments, and means to advance said carrying means through said sample and reagent addition means to said monitoring means.

111. The automated analytical apparatus of claim 110 wherein said additions to each of said reaction compartments are such that a difference in absorbance result; said monitoring means including means for measuring the absorbance of the material with each reaction compartment and means to derive a final analytical result based upon the measured absorbance differences.

112. The method of analyzing a test sample comprising providing a disposable reaction container having a reaction compartment and at least one reagent stored within said disposable container but separated from said reaction compartment, at least a portion of the reaction compartment of said disposable container being sufficiently optically transparent so that the reaction compartment can be utilized as a cuvette for optical analysis, adding a sample aliquot to the reaction compartment, adding at least one reagent stored within the disposable container to the reaction compartment, incubating said reaction mixture within said reaction compartment for a period of time sufficient to bring the reaction mixture to the desired state for analysis, and monitoring at least one of the optical properties of said reaction mixture while it is within said reaction compartment.

113. The method of claim 112 further including mixing the sample aliquot after each reagent is added thereto.

114. The method of claim 112 wherein a plurality of stored reagents are added to the reaction compartment.

115. The method of claim 114 wherein a plurality of stored reagents are added each at different times to the reaction compartment.

116. The method of claim 112 wherein the reaction mixture is monitored by measuring the optical absorbance thereof.

117. The method of claim 116 wherein the optical absorbance of the reaction mixture is determined more than once.

118. The method of analyzing a test sample comprising providing a disposable reaction container having a reaction compartment and a plurality of reagents stored within said disposable container but separated from said reaction compartment, at least a portion of the reaction compartment of said disposable container being sufficiently optically transparent so that the reaction compartment can be utilized as a cuvette for optical analysis, adding a sample aliquot to the reaction compartment, adding at least one reagent stored within the disposable container to the reaction compartment, incubating said reaction mixture within said reaction compartment, adding at least one further reagent stored within the disposable container to the reaction compartment, and monitoring at least one of the optical properties of said reaction mixture while it is within said reaction compartment.

119. The method of claim 118 wherein the reaction mixture is monitored by measuring the optical absorbance thereof.

120. The method of analyzing a test sample comprising providing a disposable reaction container having a plurality of separate reaction compartments, at least a portion of each reaction compartment being sufficiently opticaly transparent so that the reaction compartment can be utilized as a cuvette for optical analysis, and at least one reagent stored within said disposable container adjacent each reaction compartment but separated therefrom, adding a sample aliquot to each reaction compartment, adding at least one reagent stored within the disposable container to only one of the sample-containing reaction compartments, incubating said reaction mixture within said reaction compartment for a period of time sufficient to bring the reaction mixture to the desired state for analysis, and monitoring at least one of the optical properties of said reaction mixture and said sample aliquot while they are within their respective reaction compartments.

121. The method of claim 120 wherein the physical properties of the respective materials are determined by measuring the optical absorbance thereof, whereby, through use of the absorbance values obtained, useful analytical data can be derived.

122. The method of claim 120 wherein a plurality of stored reagents are added at different times to the only reagent-receiving reaction compartment.

123. The method of analyzing a test sample comprising providing a disposable reaction container having a plurality of separate reaction compartments and at least one reagent stored within said disposable container adjacent each of said reaction compartments but separated therefrom, at least a portion of each reaction compartment being sufficiently optically transparent so that each reaction compartment can be utilized as a cuvette for optical analysis, adding a sample aliquot to one of said reaction compartments, adding at least one reagent stored within said disposable container to said sample-containing reaction compartment, adding at least one reagent stored within said disposable container to at least one other reaction compartment, incubating said reaction mixture within said reaction compartment for a period of time sufficient to bring the reaction mixture to the desired state for analysis, and monitoring at least one of the optical properties of said reaction mixture and the material added to the other of said reaction compartments while they are in their respective reaction compartments.

124. The method of claim 123 wherein the optical properties of the reaction mixture and the material added to the other of said reaction compartments are monitored by measuring the optical absorbance thereof, whereby through use of the absorbance values obtained, useful analytical data can be derived.

125. The method of analyzing a test sample comprising providing a disposable reaction container having a plurality of separate reaction compartments and at least one reagent stored within said disposable container adjacent each of said reaction compartments but separated therefrom, at least a portion of each reaction compartment being sufficiently optically transparent so that each reaction compartment can be utilized as a cuvette for optical analysis, adding a sample aliquot to each reaction compartment, adding at least one reagent stored within said disposable container to each reaction compartment adjacent thereto, adding at least one further reagent stored within said disposable container to at least one of the reaction compartments such that a difference in the absorbance characteristics of each reaction mixture will result, incubating said reaction mixtures within each of said reaction compartments for a period of time sufficient to bring the reaction mixtures to the desired state for analysis, and measuring the optical absorbance of each reaction mixture while it is within its respective reaction compartment whereby, through use of the absorbance values obtained, useful analytical data can be derived.

126. A disposable reaction container comprising a lower section having at least one compartment for the admixing of materials added thereto, a storage section having a plurality of separate reagent storage chambers adapted for communication with each of said admixing compartments, and restraining means to prevent the premature movement of prepackaged reagents from said plurality of storage chambers, said restraining means comprising plugs at the end of each storage chamber adjacent said reaction compartment and in slidable engagement with the walls of said storage chamber, at least a portion of each admixing compartment being sufficiently optically transparent so that said compartment can be utilized as a cuvette for optical analysis.

127. The disposable reaction container of claim 126 wherein said plugs comprise a material which will float on the surface of a reaction mixture within said admixing compartment when prepackaged reagents are dispensed from their storage chambers.

128. The disposable reaction container of claim 126 wherein said plugs comprise a material which will sink to the bottom of the adjacent admixing compartments when prepackaged reagents are dispensed from their storage chambers.

129. The disposable reaction container of claim 126 further including means at the opposite end of said storage chamber from said plug for preventing the premature dispensing of said prepackaged reagents from said opposite end of each of said storage chambers.

130. The disposable reaction container of claim 126 further including an additional plug at the uppermost end of each of said reagent storage chambers, said uppermost plug having a rod attached thereto extending toward the plug within said chamber adjacent said admixing compartment, the axis of said rod coinciding with the longitudinal axis of said storage chamber.

131. An automated analytical apparatus adapted for use with reagent-storing disposable chemical testing containers, each of said containers being carried by a support member and being sectioned into a reaction compartment and a plurality of reagent storage compartments, said compartments being separated from each other by walls weakly bonded to the supporting carrier so that said compartments can be brought into communication upon destruction of the weak bonds; said apparatus comprising means to carry a plurality of said disposable containers, means to transfer a sample aliquot from a sample storage site to the reaction compartment within one of said plurality of disposable containers, at least one means for the addition of at least one reagent stored within the disposable container to the reaction compartment, means further along the path of travel of said carrying means to monitor at least one of the physical properties of the reaction mixture within the reaction compartment, and means to advance said carrying means through said sample and reagent addition means to said monitoring means.

132. The automated analytical apparatus of claim 131 further including means to automatically store the data obtained by said monitoring means on at least one portion of the support member.

133. The automated analytical apparatus of claim 131 further including at least one additional means for the addition of at least one reagent stored within the disposable container to the reaction compartment.

134. The automated analytical apparatus of claim 131 further including a magazine for the storage of a plurality of said disposable containers, said carrying means being adapted to advance said disposable containers from said magazine through said sample and reagent addition means to said monitoring means.

135. The automated analytical apparatus of claim 131 wherein said reagent addition means includes means to manipulate the weak bonds separating the reagent storage compartments from the reaction compartment.

136. The automated analytical apparatus of claim 135 further including means to reinforce a particular weak bond while another weak bond is being destroyed by said manipulation means.

137. The automated analytical apparatus of claim 131 further including means to record data on at least one portion of the support member.

138. The automated analytical apparatus of claim 132 further including means for shearing the reaction container portion of the support member from the portion of the support member having data thereon, and means to receive the data containing portion of the support member.

139. An automated analytical system including a disposable reaction container comprising at least one compartment for the admixing of materials added thereto, a storage section having at least one separate reagent storage chamber adapted for communication with each of said admixing compartments, and restraining means to prevent the premature movement of prepackaged reagents from said storage chambers, at least a portion of each admixing compartment being sufficiently optically transparent so that said compartment can be utilized as a cuvette for optical analysis, a station for the addition of a sample aliquot from a sample storage site to at least one of said admixing compartments, at least one station for the addition of at least one reagent stored within said disposable container to at least one of said admixing compartments, a detection station for monitoring at least one of the physical properties of each reaction mixture within each admixing compartment and deriving a final analytical result based upon the information obtained therefrom, and means to transport said disposable reaction container through each of said stations to said detection station.

140. The automated analytical system of claim 139 further including a second station for the addition of at least one further reagent stored within said disposable container to at least one of said admixing compartments.

141. The automated analytical system of claim 139 wherein said disposable reaction container has a single admixing compartment and a plurality of separate reagent storage chambers associated therewith, said system further including a second station for the addition of at least one further reagent stored within said disposable container to said admixing compartment.

References Cited

UNITED STATES PATENTS

| 2,487,236 | 11/1949 | Greenberg. | |
| 3,028,000 | 4/1962 | Clements. | |
| 3,064,802 | 11/1962 | Jess et al. | |
| 3,344,914 | 10/1967 | Bloom et al. | |
| 3,476,515 | 11/1969 | Johnson et al. | 23—253 X |

FOREIGN PATENTS

| 239,202 | 7/1962 | Australia. |
| 697,723 | 9/1953 | Great Britain. |

MORRIS O. WOLK, Primary Examiner

R. E. SERWIN, Assistant Examiner

U.S. Cl. X.R.

23—253, 259, 292; 206—47; 356—246

PO-1050
(5/69)

UNITED STATES PATENT OFFICE
CERTIFICATE OF CORRECTION

Patent No. 3,504,376          Dated March 31, 1970

Inventor(s) T. Bednar et al

It is certified that error appears in the above-identified patent and that said Letters Patent are hereby corrected as shown below:

Claim 13, line 1, cancel "10" and substitute therefor --87--;

Claim 33, line 1, cancel "23" and substitute therefor --1--;

Claim 50, line 1, cancel "38" and substitute therefor --49--;

Claim 82, line 9, cancel "analyze" and substitute therefor --analyzed--;

Claim 85, line 2, cancel "plurlity" and substitute therefor --plurality--;

Claim 92, second last line, cancel "contained" and substitute therefor --container--;

Claim 108, second last line, cancel "simple" and substitute therefor --sample--;

Claim 120, line 5, cancel "opticaly" and substitute therefor --optically--; and

Claim 138, line 1, cancel "132" and substitute therefor --137--.
Column 19, line 55, cancel "on".

SIGNED AND
SEALED

JAN. 26, 1971

(SEAL)
Attest:

Edward M. Fletcher, Jr.
Attesting Officer

WILLIAM E. SCHUYLER, JR.
Commissioner of Patents

Notice of Adverse Decision in Interference

In Interference No. 97,829, involving Patent No. 3,504,376, T. F. Bednar, G. C. Reid and A. T. Yahiro, AUTOMATED CHEMICAL ANALYZER, final judgment adverse to the patentees was rendered Sept. 23, 1976, as to claims 112, 113, 114, 115, 116, 117, 118 and 119.

[*Official Gazette March 22, 1977.*]